Patented May 25, 1954

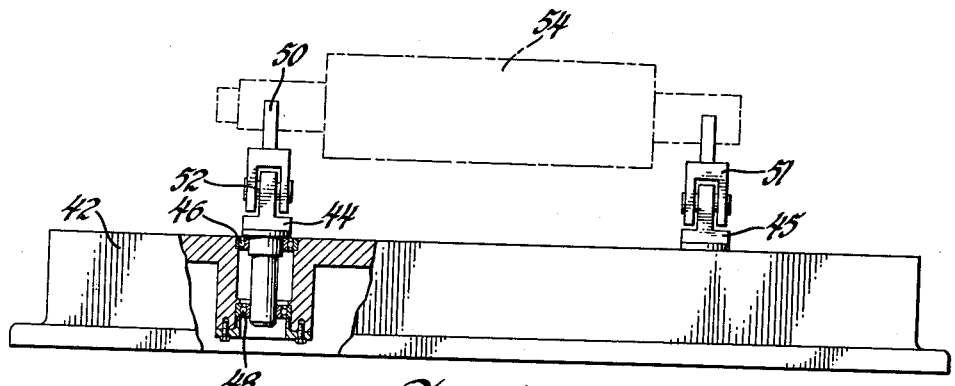
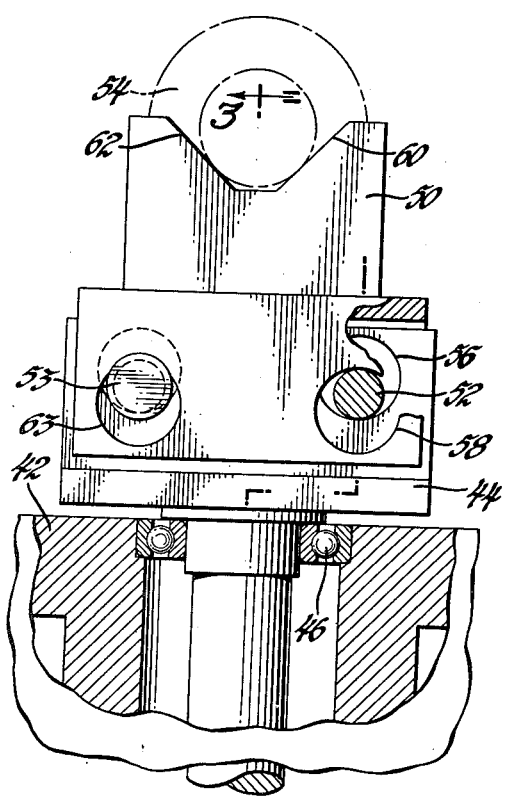
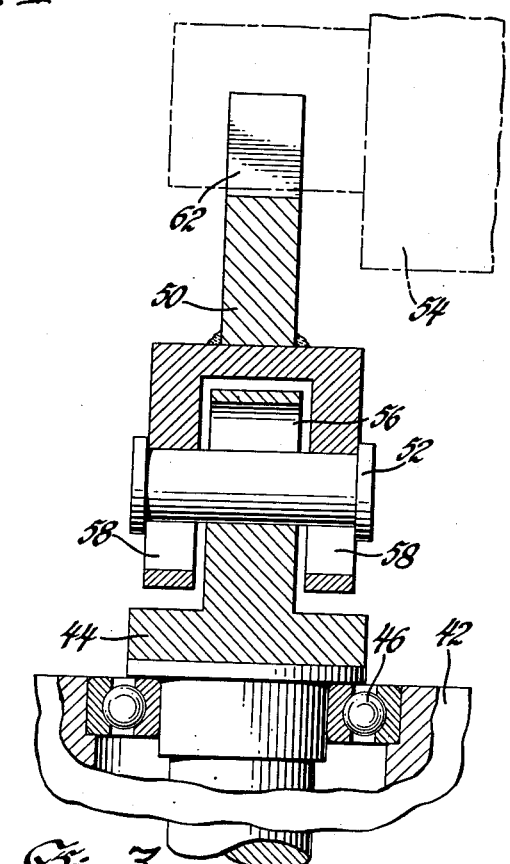

2,679,439

UNITED STATES PATENT OFFICE 2,679,439

BIFILAR SUSPENSION FOR BALANCING MACHINES

Earl F. Riopelle, Detroit, Mich., assignor to General Motors Corporation, Detroit, Mich., a corporation of Delaware Continuation of application Serial No. 761,034, July 15, 1947. This application November 24, 1950, Serial No. 197,187

11 Claims. (Cl. 308—15)

This application is a continuation of an application Serial No. 761,034, for Bifilar Suspension for Balancing Machine, filed jointly in the name of this applicant, Earl F. Riopelle, and John M. Stone, July 15, 1947, and later converted into a sole application in the name of this applicant and now abandoned.

The present invention relates to work holders for dynamic balancing machines.

More particularly it relates to work holders for dynamic balancing machines of the type disclosed in U. S. Patent No. 2,449,429, Van Degrift et al., issued September 14, 1948.

The prior art shows a large number of work holders for use in balancing machines of the type disclosed in the above application, which for the most part contain some type of spring mechanism for resiliently maintaining the proper relationship between the part being tested and the testing machine. When using a balancing machine of the present type the part under test is rotated at high speed, and preferably near the speed at which it is contemplated the part will be rotated in service. Any unbalance in the part under test shows up as rotating forces tending to displace the part from its normal axis of rotation. The part itself, and also the mount securing the part, has a definite mass. This mass when taken with the resilience of a leaf or coil spring retaining means has a natural resonance of oscillation. This natural resonance is quite objectionable and becomes increasingly serious as the frequency at which the part is being rotated approaches it.

It is desirable to maintain the work securing carriage at as low a mass as possible in order to obtain maximum sensitivity. With a low mass it becomes increasingly desirable that the spring rate be maintained at a minimum or at zero if possible. It is impossible to have any spring of zero rate and it is not practical in balancing machines to have this rate approach zero.

Another work suspension means which has been given consideration by the art is the pendulum type suspension. The pendulum type suspension overcomes the objection to the natural period of oscillation encountered in spring suspensions since it is possible to have such a low natural frequency of oscillation of the pendulum that no speed of rotation used for testing is sufficiently low to cause serious oscillation. Pendulum suspensions are quite objectionable in that they require a quite large and expensive suspension system.

It is therefore an object of the present invention to produce a work suspension means for dynamic balancing machines having pendulum-like qualities but being very compact.

It is a further object of the present invention to produce a dynamic balancing machine work securing means, which is both simple to operate, and economical to manufacture.

It is a further object of the present invention to produce a work holding means which is very flexible and highly accurate.

Other objects of the present invention will become obvious upon reading the specification and inspection of the drawings and will be particularly pointed out in the claims.

Referring to the drawings:

Figure 1 is a longitudinal view of one modification of the present invention.

Figure 2 is a partially sectionalized transverse view of the modification shown in Figure 1.

Fig. 3 is a section taken on the line 3—3 of Figure 2.

Referring to the drawings, there is shown therein the frame of a balancing machine indicated generally by the reference numeral 42, and on which there are mounted at spaced points two work supporting cradles provided by this invention. These cradles are similar in construction, one of the cradles being formed of elements 44 and 50, and the other being formed of elements 45 and 51. Each of the cradles has a cylindrical shank which is supported by ball bearings mounted in bores in the frame 42 so that each of the cradles is rotatable about a substantially vertical axis. The supporting means for one of the cradles is shown in detail in the drawings, where it will be seen that the element 44 of this cradle is supported on ball bearings 46 and 48. The ball bearing 46 is of a type which will support the element 44 both radially and axially.

The upper end of the element 44 is in the form of a relatively long narrow section having therein spaced transversely extending cylindrical holes 56 located on opposite sides of the axis of the shank of the element 44. This cradle includes another element 50 having a lower portion in the form of a channel, the side flanges of which are spaced apart a distance great enough to permit the upper end of the element 44 to extend therebetween, as is clearly shown in Figure 3 of the drawings. The side flanges of the element 50 have spaced cylindrical holes 58 and 63 extending therethrough. The holes 58 and 63 are substantially the same diameter as the holes 56 in the element 44, while the holes 58 and 63 are spaced apart horizontally substantially the same distance as the holes 56. Pins 52 and 53 extend through the holes 56, 58 and 63 and are held in position by flanges on the ends of the pins. The pins 52 are substantially smaller in diameter than the holes 56, 58 and 63, while the various parts are arranged and proportioned so that the pins 52 may normally rest on the bottoms of the holes 56 in the element 44, and so that the upper faces of the holes 58 and 63 in the element 50 rest upon the pins 52, as is clearly shown in Figures 2 and 3 of the drawings.

The upper end of the element 50 has therein a V-shaped notch having sides formed by inclined planes indicated by the reference numerals 60 and 62.

The cradle employing the elements 45 and 51 is similar in construction to the cradle employing elements 44 and 50, and a detailed description thereof is unnecessary.

A part 54 to be tested is supported by the V-shaped notches in the cradles. Although V-shaped notches are shown, it is to be understood that the invention is not limited to this arrangement and that the V-shaped notches may be replaced by spaced rollers if desired.

In the operation of the present invention the workpiece 54 is rotated at high speed by any of the normal means such as a rotating electrical field. If the part 54 has any unbalanced dynamic forces, the carriage or cradle 50 will tend to move in the transverse direction causing the rollers 52 and 53 to climb on the surfaces supporting these rollers. The amount of climb is dependent on the amount of unbalanced force at the point of support over the rollers. In the normal use of this device some means will be incorporated in the balancing machine to determine the amplitude and phase of the horizontal movement of each of the cradles 50 and 51. With this information it is possible by the use of ordinary mechanical equations to determine the magnitude and position of the dynamic unbalance of the rotating part 54.

It is to be understood also that although the invention has been described with specific reference to a particular embodiment thereof, it is not to be so limited, since changes and alterations therein may be made which are within the full intended scope of this invention as defined by the appended claims.

I claim:

1. In a work support for dynamic balancing machines, an element having a bearing surface adapted rotatably to hold the work to be balanced, a support element, means for mounting said support element against rotation about the axis of said work, pairs of partially aligned openings in said elements, and a cylindrical element of substantially smaller diameter than said aligned openings and projecting through each pair of said openings to support said first mentioned element on said second element.

2. A work support for dynamic balancing machines as claimed in claim 1 and in which the partially aligned openings are cylindrical with their axes disposed in a common vertical plane.

3. A work support for dynamic balancing machines as claimed in claim 1 and in which the support element is pivotally supported for rotation about a vertical axis.

4. A work support for dynamic balancing machines as claimed in claim 1 and in which the support element has freedom of rotation on an axis normal to the axis of rotation of the part being balanced.

5. A work support for dynamic balancing machines comprising an upper element having a bearing surface thereon for rotatably holding upon the upper surface thereof a work piece to be balanced, a lower element adapted to support said upper element, means for mounting said lower element against rotation about the axis of said work piece, said upper and lower elements having formed thereon one or more spaced pairs of oppositely disposed and arcuate supporting surfaces having different centers of curvature, and a spaced pair of rotatable elements having arcuate supporting surfaces of greater curvature than the curvature of said supporting surfaces in one of said elements and associated with said upper and lower elements and movably engaging said arcuate supporting surfaces on said elements for movably supporting said upper element against the force of gravity and upon said lower element.

6. A work support as defined in claim 5 in which rotatable means is provided for supporting said lower element.

7. A work support for dynamic balancing machines comprising an upper element having a bearing surface thereon for rotatably supporting a work piece to be balanced, a lower element adapted to support said upper element, means for mounting said lower element against rotation about the axis of said work piece, said upper and lower elements having formed thereon one or more parallel and spaced pairs of oppositely disposed and oppositely inclined supporting surfaces, and means extending between said elements and laterally movable within and adapted to engage said pairs of inclined supporting surfaces for movably supporting said upper element by said lower element.

8. A work support as defined by claim 7 wherein a third and rotatably mounted element is provided for rotatably supporting said lower element upon an axis of rotation intersecting the axis of rotation of said work piece.

9. A work support for dynamic balancing machines comprising a first element having bearing surface means formed upon the upper surface thereof for rotatably holding a work piece to be balanced, said first element being formed to provide a channel member having spaced supports, a spaced pair of rotatable elements extending across said channel member and engaging said supports, and a second element adapted to support said first element against rotation about the axis of said work piece and having formed thereon a spaced pair of arcuate supporting surfaces having greater radii of curvature than said rotatable elements, said rotatable elements being disposed within said arcuate supporting surfaces.

10. A work support as defined by claim 9 in which means is provided for rotatably supporting said second element, said means having an axis of rotation projecting through said channel in said first element and between said rotatable elements.

11. A work support for dynamic balancing machines comprising a first element having bearing surface means formed thereon for rotatably holding a work piece to be balanced, a second element adapted to support said first element, said first and second elements having arcuate supporting surfaces formed thereon, a plurality of rotatable elements having arcuate supporting surfaces of curvature differing from that of said arcuate supporting surfaces on said second elements associated with and engaging said first mentioned supporting surfaces for movably supporting said first element upon said second element, and rotatable means for supporting said second element, said rotatable means having an axis of rotation disposed normally with respect to and intersecting the axis of rotation of said work piece and extending midway between said supporting surfaces.

References Cited in the file of this patent

UNITED STATES PATENTS

| Number | Name | Date |
|---|---|---|
| 736,096 | Heise | Aug. 11, 1903 |
| 2,239,078 | Chilton | Apr. 22, 1941 |
| 2,449,429 | Van Degrift | Sept. 14, 1948 |

FOREIGN PATENTS

| Number | Country | Date |
|---|---|---|
| 186,550 | Germany | Oct. 10, 1906 |